United States Patent [19]

Boyd

[11] Patent Number: 4,787,990

[45] Date of Patent: Nov. 29, 1988

[54] LOW TOXICITY OIL-BASED DRILLING FLUID

[75] Inventor: Phillip A. Boyd, Ponca City, Okla.

[73] Assignee: Conoco Inc., Ponca City, Okla.

[21] Appl. No.: 463,779

[22] Filed: Feb. 4, 1983

[51] Int. Cl.$^4$ ............................ C09K 7/06; C09K 7/02
[52] U.S. Cl. ............................. 252/8.511; 252/8.515
[58] Field of Search .............. 252/8.5 P, 8.5 A, 8.5 C, 252/8.5 M, 8.511, 8.515; 208/19; 585/7

[56] References Cited

U.S. PATENT DOCUMENTS

| | | | |
|---|---|---|---|
| 2,584,930 | 2/1952 | Shinouda | 252/8.515 |
| 3,206,410 | 9/1965 | Möller et al. | 252/8.515 |
| 3,406,115 | 10/1968 | White | 252/8.514 |
| 3,528,914 | 9/1970 | Darley | 252/8.515 |
| 3,668,129 | 6/1972 | Willett | 252/8.515 |
| 3,849,316 | 11/1974 | Motley et al. | 252/8.515 |
| 3,850,248 | 11/1974 | Carney | 166/291 |
| 3,948,782 | 4/1976 | Dreher et al. | 252/8.515 |

FOREIGN PATENT DOCUMENTS

| 596454 | 4/1960 | Canada | 252/8.515 |
|---|---|---|---|
| 649477 | 10/1962 | Canada | 252/8.515 |

OTHER PUBLICATIONS

Chilingarian, G. V., and Vorabutr, P., *Developments in Petroleum Science 11, Drilling and Drilling Fluids*, N.Y., Elsevier Sci. Pub., 1983, p. 758.

*Primary Examiner*—John F. Terapane
*Assistant Examiner*—Virginia B. Caress
*Attorney, Agent, or Firm*—C. R. Schupbach

[57] ABSTRACT

Disclosed is a low toxicity oil for use in drilling fluids. The oil consists essentially of branched- and cyclic-paraffins having 11 to 17 carbon atoms per molecule and further having a low aromatic content of less than about 1% and a low normal-paraffin content of less than about 5%. The low polynuclear aromatic oil is useful in both oil-based and water-based drilling mud, particularly where low toxicity and lack of water sheen are important such as in offshore drilling environments. The oil also has the advantage of being non-fluorescent so that it does not mask UV fluorescence of formation crudes produced from the drill cuttings in wildcatting operations.

7 Claims, No Drawings

LOW TOXICITY OIL-BASED DRILLING FLUID

This invention relates to the art of drilling fluids and more particularly, to an improved, low toxicity oil for use in both oil-based drilling muds and as an additive to aqueous drilling muds.

BACKGROUND OF THE INVENTION

It is well known that in perforating earthen formations to tap subterranean deposits such as gas or oil, the perforation is commonly accomplished by rotary well drilling tools and a drilling fluid. The drilling fluid serves to transport to the surface the material loosened by the drilling tools, such as a drill bit; to lubricate the drilling tools including the drill string thereby reducing frictional power loss; to act as a cooling fluid to absorb heat generated by the drill bit and by frictional drag of the rotating pipe; to deposit a cake or layer on the walls of the well and within the pore spaces and crevices of the wall rocks thereby sealing porous formations and reducing water loss and to seal off high pressure gas, oil or water yielding zones so that such fluids cannot enter the well bore during the drilling operation.

Both water-based and oil-based drilling fluid systems are known. The more economical water-based systems are used when practicable with oil-based systems being used where increased lubricity at the drilling head is desirable or when traversing formations which would be adversely affected by a water-based system, such as water soluble shale formations. It will be understood that while this specification refers to oil-based and water-based systems, each of these systems may contain amounts of water and oil respectively, the basing component being considered the continuous phase and generally present in an amount greater than 50% of the slurry composition. Thus, a water-based mud system would contain a greater than 50% amount of water but may also include up to 50% oil forming an oil-in-water emulsion in the mud. Similarly, an oil-based system would contain greater than 50% oil with up to 50% water being possible and forming a water-in-oil emulsion.

Oils commonly used in both oil- and water-based mud systems are commonly crude oil, diesel oil, fuel oil and the like. In U. S. Pat. No. 3,668,129, preferred oils used as lubricants in aqueous drilling fluids contain some unsaturated and aromatic hydrocarbons because they facilitate blending with other mud components. A similar preference for aromatic and unsaturated hydrocarbons is shown in U. S. Pat. Nos. 3,948,782, 3,850,248, 3,849,316 and 3,528,914, as well as Canadian Pat. No. 596,454.

More recently, due to the toxicity of aromatics present in these oils in amounts ranging over 25%, particularly in marine environments, paraffin-based mineral oils having an aromatic content of less than about 10% are being used. One commonly used mineral oil is sold by Exxon, Inc. under the trademark Mentor-28. Such mineral oils, generally comprising normal-paraffins in the C11 to C20 range of carbon chain length, are finding favor for use in oil-based drilling muds used in off-shore drilling operations where toxicity to marine life is an important environmental consideration.

In addition to the toxicity problems, Coast Guard and Environmental Protection Agency regulations require that there be no discharge from any marine drilling operations which causes a sheen, film or discoloration to form on the water surface. All of the above-mentioned oils would create a water surface sheen upon discharge from drilling operations. Thus, overboard discharge of drill cuttings produced during drilling operations using an oil-based mud with any of the above-mentioned oils would be prohibited without some sort of washing treatment prior to discharge. Otherwise, such cuttings would need to be accumulated and hauled to shore for treatment and/or disposal. The washing of drill cuttings requires extra equipment which raises the cost of a drilling rig while further increasing the cost of an offshore platform due to the need for additional deck space and weight capacity for such equipment. Carry off disposal is also a costly operation.

Another problem with the use of oils having a high aromatic and olefin content has been recognized by Canadian Pat. No. 649,477. In drilling so-called "wildcat" exploratory wells, it is common to use a water-based drilling mud so that cuttings and/or core sections may be inspected for UV fluorescence which indicates the presence of crude oil in the formation being traversed. Since all of the above-mentioned oils for use in drilling fluids are high in aromatics and unsaturates which would cause such fluorescence, the use of an oil-based drilling mud precludes the use of this valuable exploratory technique. In the afore-mentioned Canadian Pat. No. 649,477, the patentee provides for an oil-in-water emulsion for use as an oil-based drilling fluid which limits the aromatics and unsaturates in the oil and any emulsifier used to a level of 5% or less. The refined oil is subjected to Edeleanu (SO2 liquid in benzene) processing followed by clay treatment to remove aromatics and unsaturates. A "thermally stable" oil which evidences no appreciable discoloration upon heating to at least 250° F. is produced.

SUMMARY OF THE INVENTION

The present invention provides an improved oil for use in both oil-in-water based drilling fluids which oil has low toxicity with respect to the marine environment, which creates no film, sheen or discoloration to the water surface upon discharge and which does not fluoresce when present in drill cuttings.

In accordance with the invention, a low polynuclear aromatic oil for use in drilling fluids consists essentially of a mixture of C11 to C17 branched- and cyclic-paraffins having an aromatic content of less than about 1% and a normal-paraffin content of less than about 5%. In its most preferred form, the oil of this invention contains less than about 0.5% aromatics and less than about 1% normal-paraffins.

Further in accordance with the invention, a low toxicity, oil-based drilling mud comprises greater than 50% of the above-described low toxicity, low polynuclear aromatic oil, less than 50% water, and various mud components such as emulsifiers, alkalinity control agents, viscosifiers, filtration control reagents, weighting agents, brine and wetting agents.

Still further in accordance with the invention, a water-based drilling fluid comprises greater than 50% water and less than 50% of the above-described low polynuclear aromatic oil in a mud system which further includes normal mud additives such as emulsifiers, alkalinity control agents, viscosifiers, filtration control reagents, weighting agents, brine and wetting agents.

Still further in accordance with the invention, a method of drilling a borehole comprises injecting a drilling mud into the area adjacent the drill bit of a rotary drill string, the drilling mud consisting essentially of a low toxicity, low polynuclear aromatic oil having less than about 1% aromatic content and less than about 5% normal paraffin content, the oil being characterized as a mixture of branched- and cyclic-paraffins having 11 to 17 carbon atoms per molecule of branched-and cyclic-paraffin; water and common drilling fluid additives which are known in the art.

It is therefore an object of this invention to provide a low toxicity oil-based drilling fluid which can be used in the marine environment without the need for treatment of drill cuttings prior to discharge so that a prohibited sheen on the water surface may be avoided.

It is another object of this invention to provide an oil which may be used in water-in-oil based drilling mud system which avoids the problems of toxicity and sheen associated with the use of prior oils employed in such drilling fluids.

It is a further object of this invention to provide a oil-based drilling mud which does not mask an indication of the penetration of a hydrocarbon-bearing formation by fluorescence of the drilling mud cuttings stream returned from the borehole.

DETAILED DESCRIPTION OF THE PREFERRED EMBODIMENTS

These and other objects of the invention are accomplished through the manner and form of the present invention to be described hereinafter in the more limited aspects of a preferred embodiment thereof. It will be understood by those skilled in the art that such a detailed description including specific examples of the invention in the form of preferred embodiments thereof do not constitute a limitation on the broader application of the invention as a whole.

A by-product stream from refining operations conducted by the assignee of this invention comprises a low polynuclear aromatic, high purity aliphatic hydrocarbon having a molecular weight range similar to kerosine but having a very low aromatic content. It is a colorless liquid having a mild odor, low viscosity and extremely low aromatic, olefinic and normal-paraffinic content. The material, known as CONOCO® LPA Solvent, results from a refining process in which kerosine distillate is passed through a molecular sieve to remove the normal-paraffins therein for other desired purposes. The remaining material having a very low normal-paraffin content comprises complex aromatic and olefinic hydrocarbons. This mixture is then catalytically hydrogenated to produce the desired solvent material which is generally 95 to 99% branched- and cyclic-paraffins. The material has a normal-paraffin content of less than 5% and preferably less than 1% and an aromatic content which is less than 1% and preferably less than 0.5%. The solvent material qualifies under 21 CFR as a "odorless light petroleum hydrocarbon" which may be used as both "food additives permitted in food for human consumption" as well as "indirect food additives".

A typical gas chromatography-mass spectroscopy analysis of the oil is set forth in Table I.

TABLE I

| Component | % Total |
|---|---|
| Decane | 0.01 |
| Undecane | 0.02 |
| Dodecane | 0.03 |

TABLE I-continued

| Component | | % Total |
|---|---|---|
| Tridecane | 0.16 | 0.05 |
| Tetradecane | | 0.04 |
| Pentadecane | | 0.01 |
| Hexadecane | | 0.01 |
| Branched C-10 Paraffins | | 3.8 |
| Branched C-11 Paraffins | | 3.8 |
| Branched C-12 Paraffins | | 5.1 |
| Branched C-13 Paraffins | 31 | 5.2 |
| Branched C-14 and C-15 Paraffins | | 8.9 |
| Branched C-15 and C-16 Paraffins | | 2.8 |
| Branched C-16 and C-17 Paraffins | | 1.1 |
| Branched C-17 and C-18 Paraffins | | 0.01 |
| C-9 Cycloparaffins | | 4.1 |
| C-10 Cycloparaffins | | 5.2 |
| C-11 Cycloparaffins | | 8.3 |
| C-12 Cycloparaffins | 22 | 2.5 |
| C-13 Cycloparaffins | | 1.5 |
| C-14 Cycloparaffins | | 0.61 |
| C-15 Cycloparaffins | | 0.01 |
| C-9 Dicycloparaffins | | 0.02 |
| C-10 Dicycloparaffins | | 4.0 |
| C-11 Dicycloparaffins | | 19 |
| C-12 Dicycloparaffins | 45 | 15 |
| C-13 Dicycloparaffins | | 5.3 |
| C-14 Dicycloparaffins | | 1.3 |
| C-15 Dicycloparaffins | | 0.07 |
| C-11 Tricycloparaffins | | 0.94 |
| C-12 Tricycloparaffins | 3.0 | 0.88 |
| C-13 Tricycloparaffins | | 0.80 |
| C-14 Tricycloparaffins | | 0.35 |
| C-12 Tetracycloparaffins | | 0.03 |
| C-13 Tetracycloparaffins | 0.08 | 0.04 |
| C-14 Tetracycloparaffins | | 0.01 |
| C-5 Benzenes | | 0.01 |
| C-6 Benzenes | 0.04 | 0.01 |
| C-7 Benzenes | | 0.03 |
| AVERAGE CARBON NUMBER | | 11.9 |

The low polynuclear aromatic oil is further defined as having a distillation range of 350° F. to 530° F. (177° C. to 277° C.); a Pensky-Martens flash point ranging from a minimum of 140° F. (65° C.) up to 180° F. (82° C.); a specific gravity of about 0.8; an aniline point greater than 160° F. (71° C.) and a Kauri-butanol value of about 31.5.

In accordance with the present invention, it has been found that this by-product oil may be substituted for commonly used oil basing materials in drilling muds. It has further been found that the toxicity of the drilling mud is significantly lowered when compared to drilling muds employing prior oil additives such as crude oil, fuel oil and diesel oil. The following examples will serve to illustrate the effectiveness of the low polynuclear aromatic, branched- and cyclic-paraffin oil of this invention in drilling mud formulations as compared to formulations utilizing prior known oil basing fluids. Examples are also presented which show a favorable comparison between the toxicity of prior oil basing fluids and the low polynuclear aromatic, cyclic-and branched-paraffin oil of this invention.

EXAMPLE 1

A 70/30 oil to water ratio controlled filtrate drilling fluid having a density of about 12.0 lbs per gallon was formulated utilizing LPA Solvent and with No. 2 diesel. The two formulations were as set forth in Table II as follows:

TABLE II

| LPA System Formulation | | Diesel System Formulation | |
|---|---|---|---|
| LPA Solvent (bbl) | 0.57 | #2 Diesel Oil (bbl) | 0.56 |

TABLE II-continued

| LPA System Formulation | | Diesel System Formulation | |
|---|---|---|---|
| Kenol-ES (lbs) | 8 | Kenol-Concentrate (lbs) | 8 |
| Kenox (lbs) | 4 | Kenox (lbs) | 6.4 |
| Ken-Gel (lbs) | 3.6 | Ken-Gel (lbs) | 2 |
| VR (lbs) | 8 | VR (lbs) | 8 |
| 30% CaCl$_2$ Brine (bbl) | 0.26 | 30% CaCl$_2$ Brine (bbl) | 0.26 |
| Kencal-L (lbs) | 4 | Kencal-L (lbs) | 2.4 |
| Barite (lbs) | 208 | Barite (lbs) | 216 |

Kenol-ES, Kencal-L, Ken-Gel, and VR are trademarks of IMCO for a primary emulsifier (fatty acid blend), secondary emulsifier (oil wetting surfactant), viscosifier (organophilic clay) and filtration control reagent (organophilic lignite), respectively.

It should be noted that additional amounts of organophilic clay viscosifier were required to achieve proper rheology for the LPA solvent system. This is believed to be a consequence of its low aromatic content as compared with Diesel fuel.

Following mixing for 90 minutes and hot rolling at 200° F. for a period of sixteen hours to simulate downhole use and circulation, the rheology and emulsion stability of each of the muds was tested at 120° F. The test results reported in Table III show similar performance between the mud formulated with No. 2 Diesel and that formulated with the low polynuclear aromatic, branched-and cyclic-aliphatic oil blend of this invention.

TABLE III

| | LPA System | Diesel System |
|---|---|---|
| Plastic Viscosity (PV) (centipoise) | 27 | 30 |
| Yield Point (YP) (lbs/100 ft$^2$) | 8 | 6 |
| Gel-Strenghts (10 sec and 10-min) (lbs/100 ft$^2$) | 4/7 | 3/7 |
| Emulsion Stability (ES) (Volts) | 670 | 440 |
| High-Temperature-High-Pressure Filtrate (HTHP) (300° F., 500 psi) ml | 4.8 all oil | 5.2 all oil |
| Solids Settling | None | None |
| Mud Weight (ppg) | 12.0 | 12.0 |
| Oil/Water Ratio | 70/30 | 70/30 |

EXAMPLE 2

An 80/20 oil-to-water ratio relaxed-filtrate 12.0 lbs/gal mud system was formulated using LPA Solvent and #2 Diesel in a manner similar to the above. The formulations were as set forth in Table IV.

TABLE IV

| LPA System Formulation | | Diesel System Formulation | |
|---|---|---|---|
| LPA Solvent (bbl) | 0.62 | #2 Diesel Oil (bbl) | 0.64 |
| Kencal-L (lbs) | 6.4 | Kencal-L (lbs) | 6.4 |
| 30% CaCl$_2$ Brine (bbl) | 0.17 | 30% CaCl$_2$ Brine (bb) | 0.16 |
| Ken-Gel (lbs) | 5.2 | Ken-Gel (lbs) | 1.0 |
| Barite (lbs) | 224 | Barite (lbs) | 230 |
| Mixing Time (min) | 90 | | 90 |

Following mixing for 90 minutes and hot rolling at 200° F. for sixteen hours the rheology and emulsion stability of the muds were tested at 120° F., the tests showing good agreement in the performance between the two base oils as illustrated in Table V.

TABLE V

| | LPA System | Diesel System |
|---|---|---|
| Plastic Viscosity (PV) (centipoise) | 18 | 14 |
| Yield Point (YP) (lbs/100 ft$^2$) | 4 | 5 |
| Gel-Strengths (10-sec and 10-min) (lbs/100 ft$^2$) | 4/8 | 3/4 |
| Emulsion Stability (ES) (volts) | 980 | 1040 |
| High Temperature, High Pressure Filtrate (HTHP) (300° F., 500 psi) ml | 11.6 all oil | 17 all oil |
| Solids Settling | None | None |
| Mud Weight | 12.0 | 12.0 |
| Oil/water ratio | 80/20 | 80/20 |

Toxicity of #2 Diesel fuel to marine life is an important consideration in the selection of a base oil for use in drilling muds offshore. A test was made to compare the toxicity of muds formulated with the low polynuclear aromatic oil of this invention with that of #2 Diesel fuel as set forth in Examples 3 and 4 below.

EXAMPLE 3

In order to obtain the water soluble fraction of each material, one part oil was added to nine parts aritifical seawater in glass containers. The mixture was slowly stirred for 20 hours and the oil and water phases were separated by siphoning. Toxicity tests were conducted according to the basic procedures identified in Section F of the U. S. Environmental Protection Agency Procedures Manual entitled "Bioassay Procedures for the Ocean Disposal Permit Program" (U.S. EPA, 1978). Mysid shrimp *Mysidopisis bahia*) employed as test organisms were all less than 6 days old. Aritifical seawater was used to dilute the water phase of each mixture to appropriate test concentrations and as the control. Aeration was not needed to maintain levels of dissolved oxygen in test media above 4 ppm. Three replicates of each tested material were made.

Results of the toxicity tests are reported as parts per million of the water phase containing the water soluble fraction of each test material. Test results were interpreted by standard statistical techniques. The moving average method was employed to calculate 24-, 48-, and 96-hour LC 50 in each case. The 48-hour and 96-hour LC 50 for Mysid shrimp exposed to the water phase containing the water soluble fraction of the low polynuclear aromatic oil of this invention was 1,000,000 ppm.

The 48-hour and 96-hour LC 50 for Mysid shrimp exposed to the water phase containing the water soluble fraction of Mentor 28 mineral oil was similarly 1,000,000 ppm.

The 48-hour LC 50 for Mysid shrimp exposed to the water phase containing the water soluble fraction of #2 Diesel fuel was 258,600 ppm (0.95 confidence interval=144,600 to 371,600). The 96-hour LC 50 was 70,700 ppm (0.95 confidence interval=55,200 to 88,600).

The LC 50 tests measure the concentration of the tested material in which at least a 50 percent survival rate for the shrimp is achieved. In the above tests, 90% of the shrimp in the control sample containing only artificial seawater survived. In the tests of LPA solvent and Mentor 28 oil, 100% concentration of the water phase solution resulted in 90% survival in the LPA (equal to the control) and 75% survival in the Mentor 28. Thus, in summation, it can be seen that the water soluble portion of LPA solvent is substantially non-toxic to marine life, Mentor 28 oil is slightly toxic, while #2 Diesel fuel is moderately toxic.

EXAMPLE 4

This example compares the acute toxicity of drill cuttings which have been soaked in laboratory prepared LPA solvent-based drilling mud; laboratory prepared and field-collected #2 Diesel oil-based drilling mud, and cuttings which have been washed following soaking in a field-collected #2 Diesel oil-based drilling mud.

Toxocity tests were conducted according to the basic procedures identified in Annexes I and III of the protocols developed by Region II, U. S. Environmental Protection Agency and the Offshore Operators Committee (1980). The solid phase bioassays were performed with sand shrimp (*Crangon septemspinosus*), hard clams (*Mercenaria mercenaria*), and sandworms (*Nereis virens*). All species were tested in the same 38-liter (10-gallon) aquaria at 20±1° C. in artificial seawater with a control subtidal zone sea sediment consisting primarily of sand. Table VI summarizes the data produced by solid-phase bioassays with sand shrimp, hard clams and sandworms.

TABLE VI

| Cuttings | Percent Survival | | |
|---|---|---|---|
| | Sand Shrimp | Hard Clams | Sandworms |
| Control (no cuttings) | 98 | 98 | 96 |
| LPA Mud Treated cuttings (Lab) | 12 | 98 | 99 |
| Diesel Mud Treated cuttings (Lab) | 0 | 68 | 0 |
| Diesel Mud Treated cuttings (Field) | 0 | 99 | 69 |
| Washed Diesel Mud Treated Cuttings | 0 | 99 | 100 |

Sand shrimp were extremely sensitive to all types of drill cuttings (survival range from 0 to 12%). Only LPA solvent mud treated drill cuttings allowed any shrimp to survive the 10 day exposure. In addition, the toxicity of all types of diesel cuttings was so great that all sand shrimp were killed within 48 hours of exposure. Unwashed field sample diesel drill cuttings reduced worm survival by 31%, laboratory sample diesel drill cuttings killed all worms and washed diesel drill cuttings and LPA drill cuttings did not reduce survival below the control level. Hard clams were apparently unaffected by any of the cuttings except for a 32% reduction in the survival of worms exposed to the laboratory-prepared diesel drill cuttings.

The use of the low polynuclear aromatic oil of this invention as a base oil fluid for oil based drilling muds offers a further advantage of using an oil-based drilling mud without masking the fluorescence which provides a driller with an early indication of a hydrocarbon formation being entered by the drill string during drilling. The presence of crude in the drilling mud utilizing the low polynuclear aromatic oil of this invention can be easily detected by fluorescence of the mud under ultraviolet light stimulation. Since diesel oil and other lower toxicity normal-paraffin based oils fluoresce under these conditions, the use of LPA solvent as an oil base (which does not fluoresce) allows the driller or explorationist an indication of subsurface hydrocarbons present in the earthen formation being drilled.

From the foregoing it can be seen that the present invention provides an improved oil for use in both oil-in-water based drilling fluids which has low toxicity with respect to the marine environment. It has also been shown that discharge of drilling materials containing the low polynuclear aromatic oil of this invention would create no apparent film, sheen or discoloration to the water surface. Further, no fluorescence is indicated in drill cuttings by the use of the low polynuclear aromatic oil of this invention offering the explorationist the advantage of an early indication of a hydrocarbon bearing formation being traversed by the drilling operation.

It has further been shown that in accordance with the invention, a low polynuclear aromatic oil of low toxicity for use in drilling fluids comprises a mixture of C11 to C17 branched-and cyclic-paraffins having an aromatic content of less than about 1% and a normal-paraffin content of less than about 5%.

While the invention has been described in the more limited aspects of a preferred embodiment thereof, other embodiments have been suggested and still others will occur to those skilled in the art upon the reading and understanding of the foregoing specification. It is intended that all such embodiments be included within the scope of this invention as limited only by the appended claims.

Having thus described my invention, I claim:

1. A drilling fluid for use in rotary drilling of earthen formations consisting essentially of at least one drilling fluid additive selected from the group consisting of emulsifiers, viscosifiers, alkalinity control agents, filtration control reagents, weighting agents, brine, and wetting agents and further including a low polynuclear aromatic oil consisting essentially of 95 to 99% by weight branched-and cyclic-paraffins having 11 to 17 carbon atoms per molecule, said low polynuclear aromatic oil containing less than about 1% by weight aromatic hydrocarbons and less than about 5% by weight normal paraffins.

2. The drilling fluid as set forth in claim 1 wherein the drilling fluid is an oil-in-water emulsion containing less than 50% by volume of said low polynuclear aromatic, branched- and cyclic-paraffin oil.

3. The drilling fluid as set forth in claim 1 wherein the drilling fluid is a water-in-oil emulsion containing greater than 50% by volume of said low polynuclear aromatic, branched-and cyclic-paraffin oil.

4. The drilling fluid as set forth in claim 1 wherein said low polynuclear aromatic oil contains less than about 0.5% by weight aromatic hydrocarbons.

5. The drilling fluid as set forth in claim 4 wherein said low polynuclear aromatic oil has a normal-paraffin content of less than about 1% by weight.

6. A method of drilling a borehole comprising the steps of:
providing a rotary drilling rig having a rotating drill bit in the borehole; and
injecting a low polynuclear aromatic oil-containing drilling fluid into the borehole at the rotating bit wherein the low polynuclear aromatic oil consists essentially of branched-and cyclic-paraffins having an aromatic content of less than 1% by weight and a normal-paraffin content of less than about 5%.

7. The method as set forth in claim 6 further including the steps of collecting drill cuttings produced by the rotating drill bit and inspecting the collected drill cuttings under ultraviolet light in order to note fluorescence thereof.

* * * * *